United States Patent
Spears et al.

(10) Patent No.: US 7,433,092 B2
(45) Date of Patent: Oct. 7, 2008

(54) TRANSPARENCY MEDIA ADAPTER AND METHODS OF USE THEREOF

(75) Inventors: Kurt E Spears, Fort Collins, CO (US); Rodney C. Harris, Fort Collins, CO (US); Eric Fernandez, Mesilla Park, NM (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 993 days.

(21) Appl. No.: 10/723,039

(22) Filed: Nov. 26, 2003

(65) Prior Publication Data
US 2005/0111060 A1    May 26, 2005

(51) Int. Cl.
*H04N 1/04* (2006.01)
(52) U.S. Cl. ........................ 358/474; 358/487; 358/486; 359/821; 399/199; 250/234
(58) Field of Classification Search ................. 358/474, 358/487, 486, 494, 484, 475, 509, 471, 505, 358/506; 359/821; 399/199; 250/234–236
See application file for complete search history.

(56) References Cited

U.S. PATENT DOCUMENTS

| | | | | |
|---|---|---|---|---|
| 5,463,217 A | * | 10/1995 | Sobol et al. | 250/234 |
| 5,535,021 A | | 7/1996 | Chiang et al. | |
| 5,585,627 A | * | 12/1996 | Akutsu et al. | 250/234 |
| 5,814,809 A | * | 9/1998 | Han | 250/208.1 |
| 5,986,774 A | | 11/1999 | Han et al. | |
| RE36,503 E | * | 1/2000 | Rubley et al. | 250/208.1 |
| 6,124,952 A | | 9/2000 | Shieh et al. | |
| 6,389,183 B1 | | 5/2002 | Han | |
| 6,519,023 B1 | | 2/2003 | Chang | |
| 6,587,231 B1 | | 7/2003 | Sung | |
| 6,621,601 B1 | | 9/2003 | Liang | |
| 6,624,914 B1 | * | 9/2003 | Hendrix et al. | 358/484 |
| 6,639,697 B1 | * | 10/2003 | Geer | 358/487 |
| 6,650,445 B1 | * | 11/2003 | Witte et al. | 358/509 |
| 6,831,759 B1 | * | 12/2004 | Witte et al. | 358/474 |
| 7,190,495 B2 | * | 3/2007 | Lam | 358/474 |
| 7,268,923 B2 | * | 9/2007 | Schroath et al. | 358/474 |
| 2003/0043351 A1 | * | 3/2003 | Ochi et al. | 355/18 |
| 2003/0063333 A1 | * | 4/2003 | Boll | 358/494 |
| 2005/0094224 A1 | * | 5/2005 | Shilling | 358/487 |

FOREIGN PATENT DOCUMENTS

EP    0977421    2/2000
WO   WO99/37086    7/1999

OTHER PUBLICATIONS

French Search Report dated Apr. 4, 2006.

* cited by examiner

*Primary Examiner*—Edward L. Coles
*Assistant Examiner*—Negussie Worku

(57) ABSTRACT

Transparency media adapter and methods of using the same. Implementations of a system may comprise an imaging device having a light source and at least one sensor. A media adapter operatively associated with the imaging device includes a first reflective surface and a second reflective surface arranged to shift light emitted by the light source to a predetermined focus point of the at least one sensor during an imaging operation.

21 Claims, 4 Drawing Sheets

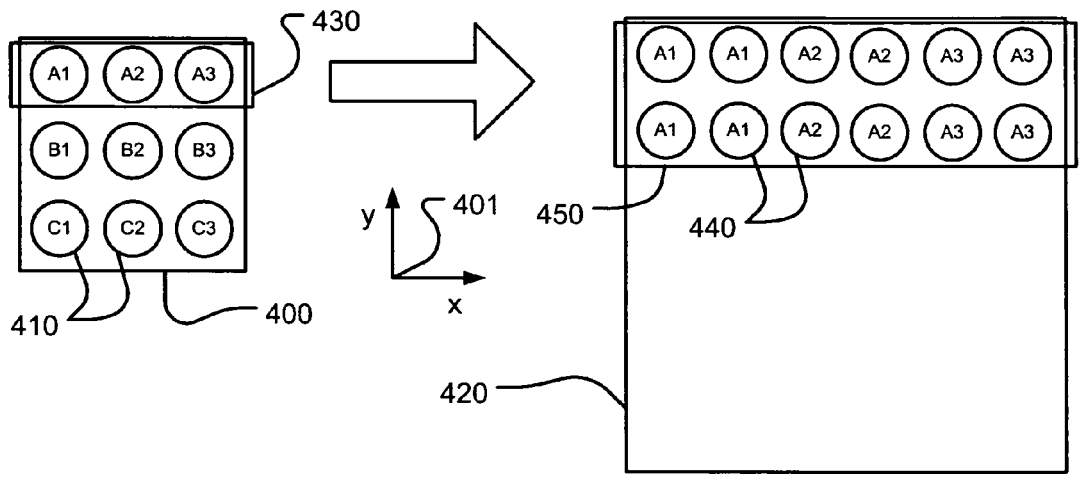
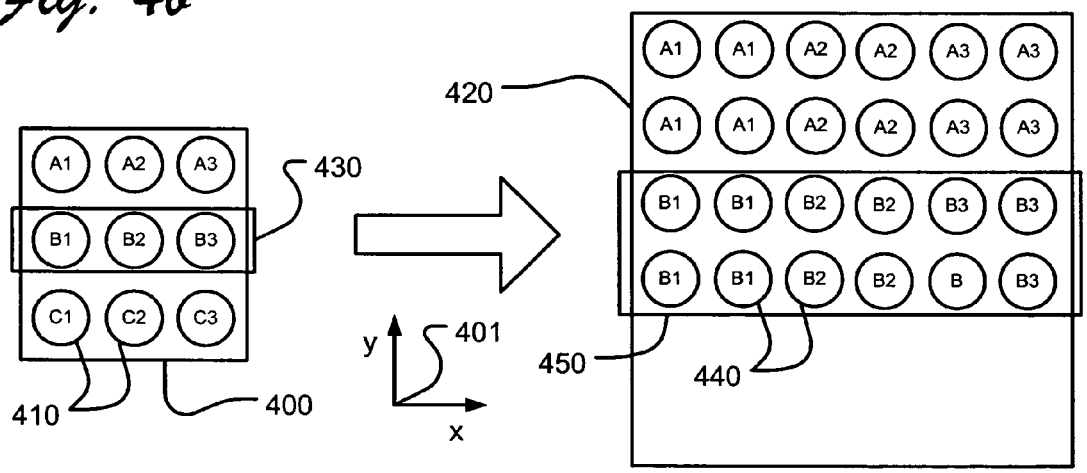
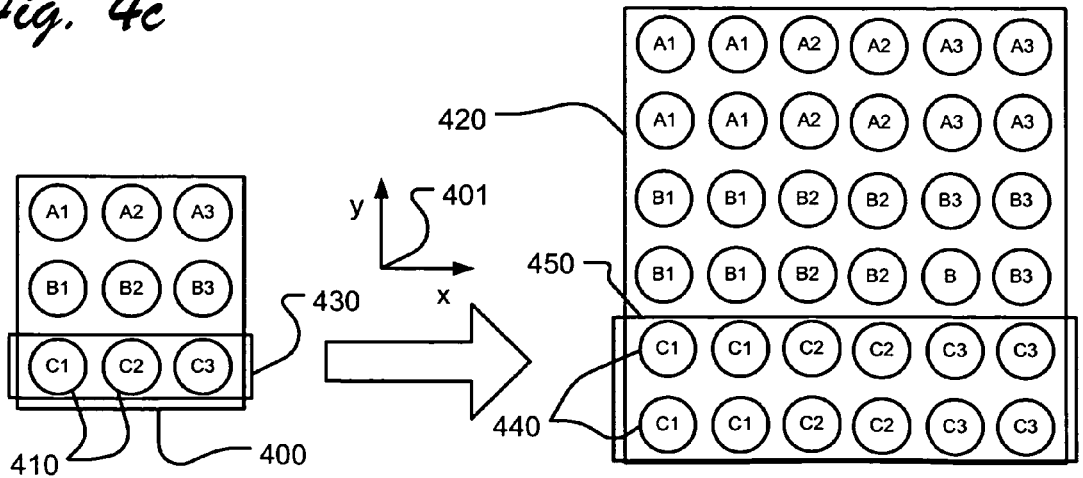

TRANSPARENCY MEDIA ADAPTER AND METHODS OF USE THEREOF

TECHNICAL FIELD

The invention generally pertains to imaging devices, and more specifically, to transparency media adapters for use with imaging devices.

BACKGROUND

Imaging devices, such as scanners, copiers, facsimile machines, and multipurpose machines, are readily commercially available for converting tangible images (e.g., documents, photographs) or images of objects (e.g., the cover of a book) into electronic images. These imaging devices operate by generating light from a light source in the imaging device and reflecting this light off of the surface of the tangible image or object. The reflected light is collected on an array of photosensitive elements, which convert the reflected light into electronic signals representing the image.

Imaging devices may be provided with external media adaptors that can be used with the imaging devices for different types of media. For example, media adapters are available that employ back lighting (e.g., cold cathode fluorescent light bulbs) to back light semi-transparent images, such as overhead transparencies and film negatives.

Contact image sensor (CIS) imaging devices may employ light emitting diodes (LEDs) as the light source (or other suitable light source), and one or more rows of CIS sensors. CIS imaging devices tend to be thinner, lighter, more energy efficient, and less expensive than imaging devices employing optical reduction technology. However, CIS sensors use a gradient index lens array which have a limited depth of focus. Therefore, CIS imaging devices are not readily adaptable for use with conventional media adapters that use back lighting for imaging transparency media because of the thickness of the media or mounting location at some height above the surface of the scanner glass.

SUMMARY

Implementations of a system may comprise an imaging device having a light source and at least one sensor; and a media adapter operatively associated with the imaging device. The media adapter including a first reflective surface and a second reflective surface arranged to shift light emitted by the light source to a predetermined focus point of the at least one sensor during an imaging operation.

Implementations of a method may comprising: projecting light along a first axis onto a transparency imaging surface, reflecting the light from the transparency imaging surface along a second axis substantially perpendicular to the first axis to shift the light to a predetermined focus point of a sensor during an imaging operation, and reflecting the shifted light substantially perpendicular to the second axis onto at least one sensor.

BRIEF DESCRIPTION OF THE DRAWINGS

FIGS. 4a-c are high level illustrations of an exemplary imaging operation.

DETAILED DESCRIPTION

Implementations of an imaging system 100 may include an imaging device 101 and media adapter 200. The media adapter 200 may be used to generate electronic images of the transparency media during an imaging operation by shifting images of transparency media to a focus point for one or more sensors in the imaging device 101.

Exemplary Imaging System

Figure 1:
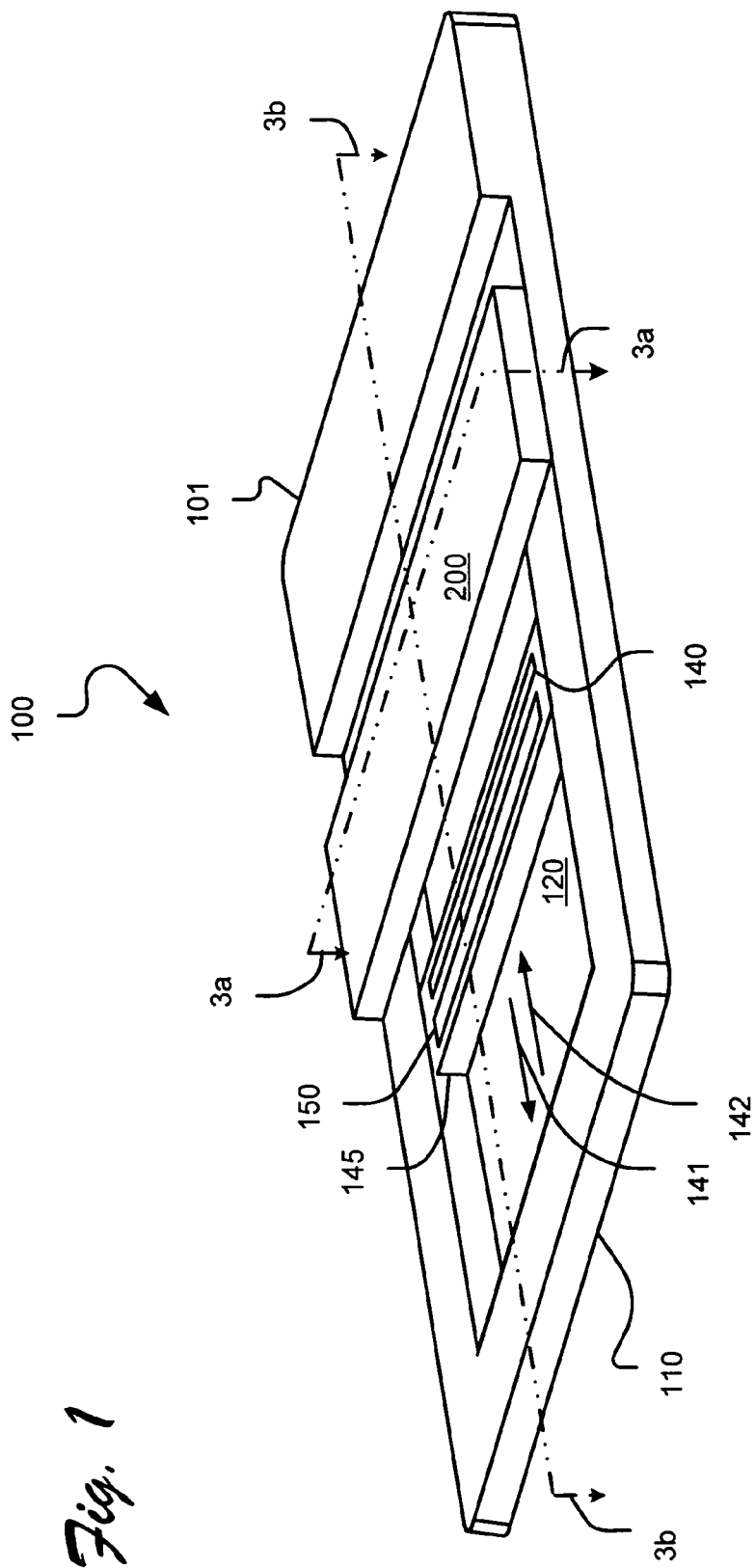
FIG. 1 is a perspective view of an exemplary imaging system.

FIG. 1 is a perspective view of an exemplary imaging system 100. Imaging system 100 may comprise an imaging device 101, such as a flatbed scanner. Although the invention will be described herein with reference to a flatbed scanner for purposes of illustration, it is understood that the invention is not limited to use with flatbed scanners. For example, imaging device 101 may comprise copiers, facsimile machines, multipurpose machines, digital imaging machines, and other electronic devices for capturing digital images.

Imaging device 101 may comprise a housing 110 having an imaging surface 120 (e.g., glass platen). Imaging device 101 may also comprise a light source 140 mounted on a carriage 145 within the housing 110 beneath the imaging surface 120. Carriage 145 is operable to move the light source 140 (e.g., in the directions illustrated by arrows 141 and 142) to illuminate object(s) placed adjacent the imaging surface 120. Light reflected from the object is collected on photosensitive elements 150, which convert the reflected light into electronic signals representing the image.

In one exemplary implementation, imaging device 101 is a contact image sensor (CIS) imaging device. The light source 140 of a CIS imaging device may include light emitting diodes (LEDs). For example, red, green and blue LEDs may be used to produce white light. Alternatively, other light sources may also be used, such as, e.g., a white lamp.

The photosensitive elements 150 may include, for example, a row of CIS sensors typically utilizing CMOS (Complimentary Metal Oxide Semiconductor) sensors or CCD (Charge Coupled Device) sensors. CIS imaging modules have a shallow depth of focus, and therefore may be positioned near (e.g., within about 1 mm) the platen surface. Optionally, one or more lenses (e.g., 155 in FIGS. 3a and 3b) may also be provided adjacent the CIS sensors to focus the reflected light onto the CIS sensors.

In one exemplary implementation, the CIS imaging device may include a row of SELFOC® lenses. A characteristic of the SELFOC® lens is its short focus length. In addition, the compact size and cylindrical geometry of the SELFOC® lens allow these lenses to be provided in tight rows or arrays (e.g., on carriage 145).

The light source and sensors for use with CIS imaging devices can be packaged together as a CIS module for use with the imaging device. These CIS modules are readily commercially available.

It will be readily appreciated that imaging device 101 may also be provided with various ancillary devices. For example, imaging devices are often equipped with automatic document feeders, paper trays, I/O ports, output trays, LCD displays, and/or keypads to name only a few. These and other ancillary devices are commonly associated with imaging devices, and therefore are not shown or described herein as their description is not needed to fully understand or to practice the invention.

The foregoing description of imaging device 101 is provided as an illustration of a general environment in which media adapter 200 may be implemented. It should be understood, however, that media adapter 200 may be used in conjunction with any of a wide range of other types and configurations of imaging devices that are now known or that may be developed in the future, and are not limited to use with flatbed scanners.

Figure 2:
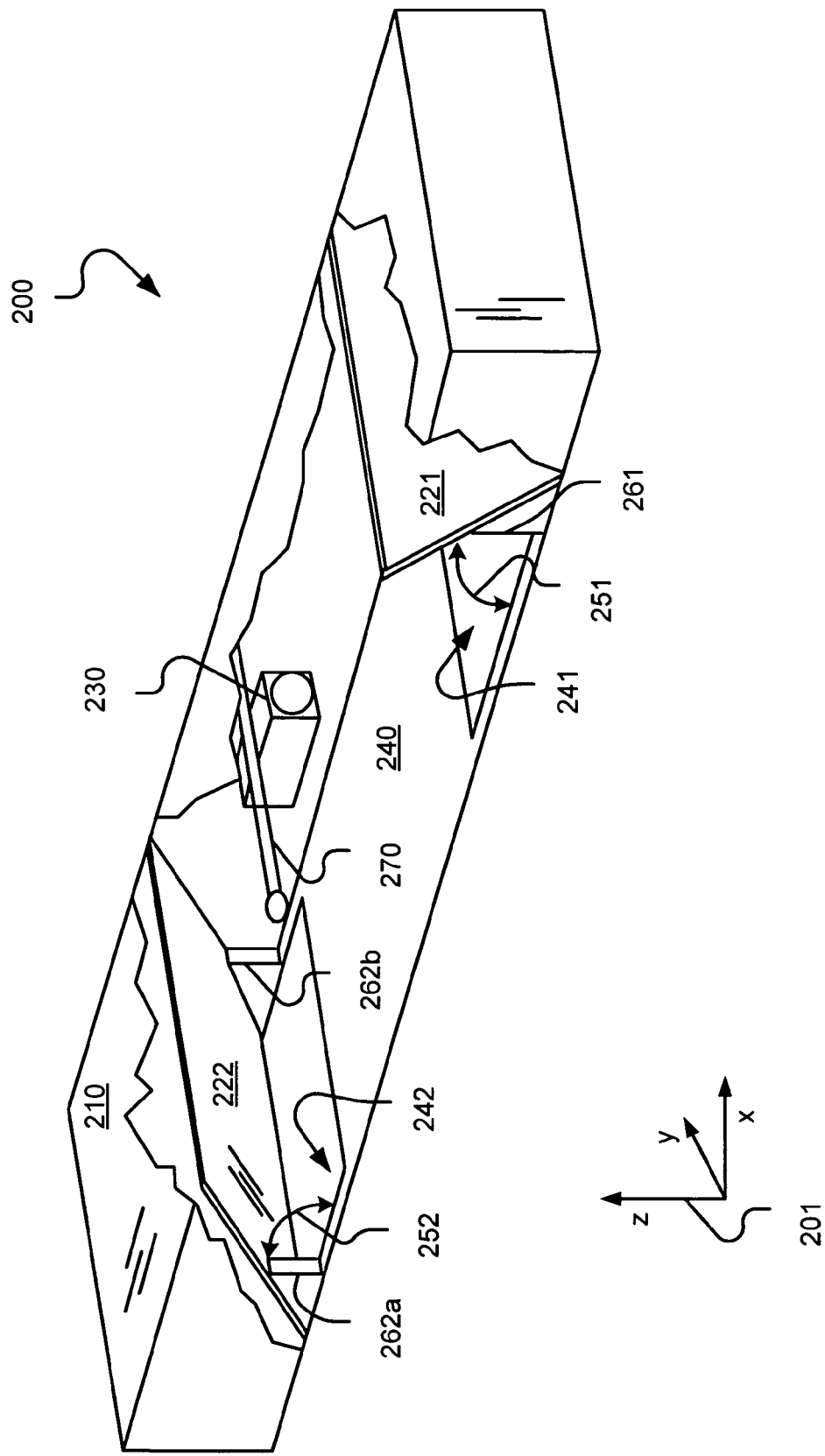
FIG. 2 is a cut-away perspective view of an exemplary media adapter.

FIG. 2 is a cut-away perspective view of an exemplary media adapter. Axis 201 is arbitrary and merely shown as a convenience for orienting the reader. Media adapter 200 may be used in operation for imaging transparent or semi-transparent media (hereinafter, transparency media), such as overhead transparencies, film negatives, or 35 mm slides, to name only a few examples.

Media adapter 200 may be provided as a separate device, as shown in FIG. 2, although in other implementations media adapter 200 may be provided as part of the housing of an imaging device. Media adapter 200 comprises a housing 210 and, internally, reflective surfaces such as mirrors 221, 222, and lens assembly 230.

Housing 210 may be manufactured from any suitable material, such as injection molded plastic. One or more openings or windows 241, 242 may be formed in the floor 240 of housing 210 to allow light to enter and exit the media adapter during an imaging operation. Optionally, windows 241, 242 include a transparent covering (e.g., glass or clear plastic).

Mirrors 221, 222 are positioned in the media adapter 200 in such a manner so as to shift the image of a transparency medium along the x-axis to a predetermined focus point of the sensors (e.g., for optimum clarity) during an imaging operation. Mirrors 221, 222 may be mounted adjacent windows 241, 242 in the media adapter 200 in any suitable manner. For example, mirrors 221, 222 may be mounted to tab portions 261, 262a, 262b provided on the housing 210. It is noted that another tab portion (similar to tab portion 262b) may also be provided on the opposite side of mirror 221, although it is not visible in FIG. 2.

In one implementation, mirrors 221, 222 are mounted at a predetermined angle to receive light from the light source, project the light along the x-axis between the mirrors 221, 222, and reflect the light off of mirror 222 into the imaging device and onto the sensor(s) therein. Predetermined angles are illustrated by arrows 251, 252. For example, mirrors 221, 222 may each be mounted in the range of about 10° to 50° relative to the floor 240 of housing 210.

Before continuing, it should be noted that the mirrors 221, 222 are not limited to being mounted at any particular angle. The predetermined angle will depend at least to some extent on design considerations, such as the position of the sensors, and the desired magnification, if any, of the image, to name only a few examples. Further, the mirrors 221, 222 do not have to be mounted at the same angle.

Adjustments may also be provided to change the predetermined angle of the mirrors 221, 222. For example, positioning screws may be provided on tab portions 261, 262 to adjust the mounting angle of the mirrors 221, 222. In another example, electronic adjustments may be provided to automatically adjust the mirrors 221, 222. Still other implementations are also contemplated, as will be readily appreciated by those skilled in the art after having become familiar with the teachings herein.

Lens assembly 230 may be mounted to the housing 210 of media adapter 200 between the mirrors 221, 222 to focus the light projected onto the mirror 222. Optionally, lens assembly 230 may also magnify and/or enhance the resolution of the projected image, as discussed in more detail below.

In one implementation, lens assembly 230 is slidably mounted to a rail or track 270 provided on the housing 210 so that the lens assembly 230 can be moved (e.g., in the y directions). Lens assembly 230 may be moved along the track 270 mechanically (e.g., by the scanner carriage connecting to a lever projecting through the housing 210) or automatically (e.g., by an electric motor operatively associated with the track 270). Lens assembly 230 may also be mounted to move in the x-direction and/or the z-direction (e.g., for positioning adjustments).

Lens assembly 230 may include one or more lenses. For example, lens assembly 230 may include a single lens that inverts the projected image, or multiple lenses. In addition, the image need not be inverted. The number and type of lenses will depend at least to some extent on various design considerations, such as the desired magnification of the image, the desired resolution of the image, and whether the image should be inverted or non-inverted, to name only a few such considerations.

Figure 3A:
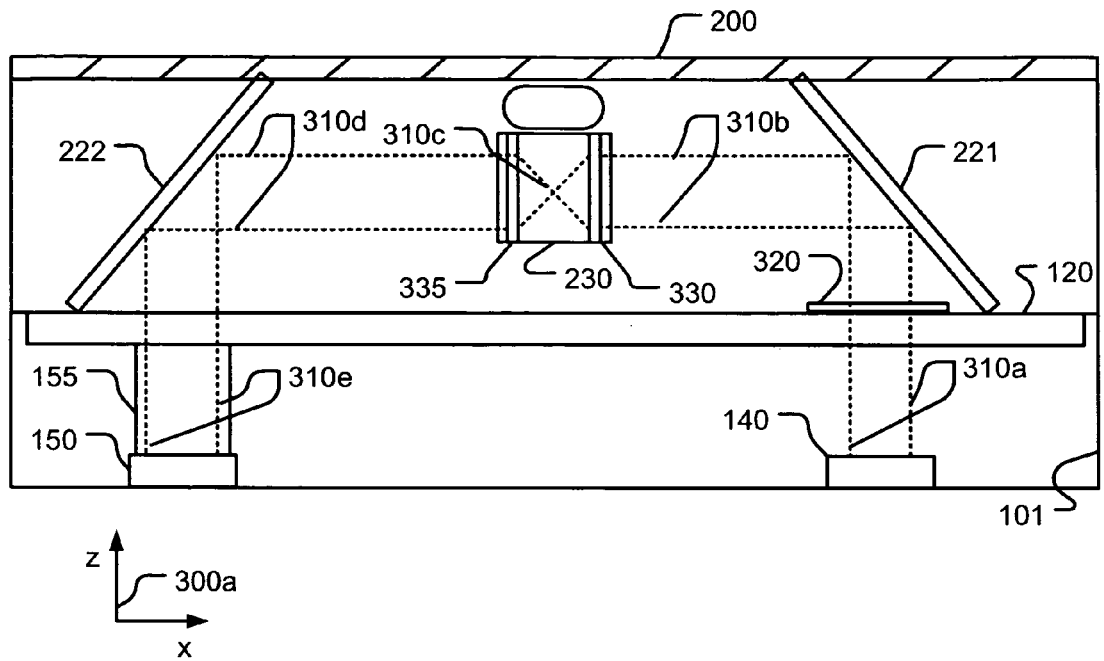
FIG. 3a is a side view of an exemplary imaging system taken along line 3a-3a in FIG. 1.

FIG. 3a is a cut-away side view of an exemplary imaging system taken along line 3a-3a in FIG. 1. Axis 300a is arbitrary and merely shown as a convenience for orienting the reader. In FIG. 3a, light generated during an imaging operation projects images of transparency media to a predetermined focus point above sensor(s) 150. The light path is illustrated by dashed lines 310a-e. The light path is intended to illustrate the path and not the orientation of the image. For example, if both of the optics shown are simple positive power elements, then it may create an erect image. If one is positive and the other negative, then the image may be inverted.

Light originates at the light source 140 and is projected along path 310a through transparency medium 320. The light illuminates the transparency media 320 and projects an image onto mirror 221. Mirror 221 reflects the image along light path 310b into lens assembly 230.

Lens assembly 230 includes at least one lens 330 to focus the image. Lens 330 also inverts the image, as illustrated by path 310c. An optional lens 335 may also be used to re-invert the image so that the image exiting lens assembly 230 is a non-inverted image.

The non-inverted image is projected along light path 310d onto mirror 222. Mirror 222 reflects the non-inverted image along light path 310e onto sensor(s) 150. Lens 155 (e.g., a SELFOC® lens) may be provided to focus the image reflected by mirror 222 onto sensor(s) 150.

Figure 3B:
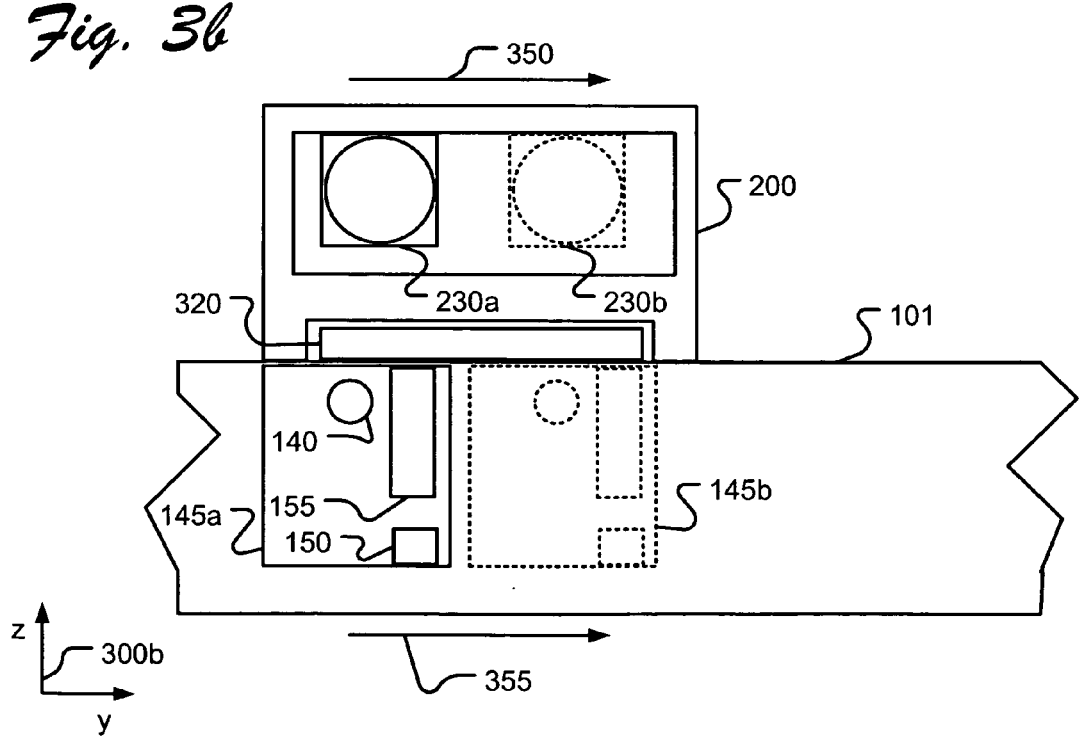
FIG. 3b is another side view of an exemplary imaging system taken along line 3b-3b in FIG. 1.

FIG. 3b is another cut-away side view of an exemplary imaging system taken along line 3b-3b in FIG. 1. Axis 300b is arbitrary and shown merely as a convenience for orienting the reader. During an imaging operation, the lens assembly 230 may be moved (e.g., along rail 270 in FIG. 2), for example, to illuminate a larger portion of the transparency medium 320. As an illustration, lens assembly 230 is shown moving along the y-axis in the direction of arrow 350 from a first position at 230a to a second position at 230b.

Movement of the lens assembly 230 may correspond to movement of the carriage 145 along the y-axis in the direction of arrow 355. In one exemplary implementation, the lens assembly 230 moves at the same rate and in the same direction as the carriage 145. However, other implementations are also possible. For example, the lens assembly 230 need not move at all.

Movement of the lens assembly 230 may be accomplished in any suitable manner. In one implementation, only the lens assembly 230 is moved within the media adapter 200. Alternatively, movement of the lens assembly 230 may be accompanied by movement of the mirrors 221, 222 (e.g., moving as a unit). In yet another implementation, the entire media adapter 200 may move relative to the imaging device 101. Alternatively, the lens assembly 230 and carriage 145 may remain stationary, and the transparency media may be moved.

Mechanical and/or electrical components, along with suitable control software/firmware to move the lens assembly can be readily provided and should not be limited to any particular implementation. A more detailed description of particular implementations is not necessary for a full understanding of the invention.

Exemplary Operations

Electronic images are often characterized by sharpness and clarity (i.e., resolution). The imaging device may have a sampling resolution measured in dots per inch (dpi). For purposes of illustration, a 300×300 dpi imaging device is capable of producing an electronic image having a resolution in the x-direction (Rx) of 300 dots over a length of one inch, and a resolution in the y-direction (Ry) of 300 dots over a length of one inch.

Imaging system 100 may be operated to generate electronic images of transparency media without magnifying the transparency image. The resolution of the sampled image is the same in both directions as the resolution of the original image (i.e., 1:1). Exemplary sampling parameters of an imaging device 100 that produces electronic images without magnification are summarized in Table 1.

TABLE 1

| | Imaging Operation without Magnification | |
|---|---|---|
| | Inverted Image | Erect Image |
| Lens motion | Same direction and speed as scanner carriage | Same direction and speed as scanner carriage OR Lens may be stationary |
| X sampling resolution | Rx | Rx |
| Y sampling resolution | Ry = Rx | Ry = Rx |
| Effective total resolution | 1:1 | 1:1 |

Imaging system 100 may also be operated to magnify the transparency image. In one implementation, the transparency image may be magnified in the x-direction physically by adjusting the distance between the transparency media and the lens assembly 230 (e.g., along the x-axis) to project a magnified image onto the sensor(s) 150.

Magnification may also result in a higher resolution of the sampled image. For example, magnifying a transparency image two-fold results in an electronic image having an effective resolution two times the actual scanning resolution. If the image is magnified two-fold and scanned at 300 dpi, the electronic image has an effective resolution of 600 dpi.

Imaging device 100 may be implemented to produce electronic images with magnification as summarized in Table 2.

TABLE 2

| | Imaging Operation with Magnification (n > 1) | |
|---|---|---|
| | Inverted Image | Erect Image |
| Lens motion | Same direction and speed as scanner carriage | Same direction and speed as scanner carriage |
| X sampling resolution | Rx = Ry * n | Rx = Ry * n |
| Y sampling resolution | Ry | Ry |
| Effective total resolution | n:1 | n:1 |

As is readily apparent from the implementation in Table 2, magnifying the image size in the x and y axis and then moving the lens 230 at the same speed and direction as the scanner carriage 145 allows an effective increase in resolution in the x-direction, but not in the y-direction. Instead, the image may be magnified in the y-direction by increasing the sampling rate, as discussed below with reference to the illustration in FIGS. 4a-c.

FIGS. 4a-c are high level illustrations of an exemplary imaging operation with magnification. Axis 401 is arbitrary and merely shown as a convenience for orienting the reader. Transparency medium 400 includes a transparency image represented by circles 410. For purposes of this illustration, each circle 410 represents 100 dots. Accordingly, transparency medium 400 has a resolution of 300 dpi in both the x and y directions (i.e., a total resolution of 300×300 dpi).

The transparency medium 400 is sampled during an imaging operation to generate electronic image 420. For example, during an imaging operation the light source may be moved adjacent the transparency medium 400 to illuminate the transparency image (e.g., circles 410). The illuminated image is shifted to a focus point of the sensors, e.g., as described above. Electronic image data (e.g., circles 440) is received at the sensors to generate electronic image 420.

Sampling the transparency medium 400 is illustrated in FIGS. 4a-c. In FIG. 4a, the sampled image is outlined by box 430 and electronic image data corresponding to the sampled image is outlined by box 450. The sampled image is shown in FIG. 4b and 4c as the imaging operation proceeds along the y-axis (e.g., as the light source is moved to illuminate the transparency medium 400).

During the imaging operation, the transparency image is magnified in the x-direction by projecting a magnified image, as discussed above. The transparency image (circles 410) is also magnified in the y-direction by increasing the sampling rate. It is readily apparent from this illustration that the transparency image (circles 410) is magnified in both the x-direction and the y-direction to generate an electronic image 420 with a higher resolution (e.g., 600×600 dpi) than the resolution of the transparency image 400 (e.g., 300×300 dpi).

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed is:

1. A system comprising:

an imaging device having a light source, at least one sensor, and an imaging surface on which a transparency medium is to be placed, wherein the light source and at least one sensor are positioned in the imaging device on a first side of the imaging surface; and a media adapter operatively associated with the imaging device, the media adapter including a first reflective surface and a second reflective surface arranged to shift light emitted by the light source to a predetermined focus point of the at least one sensor during an imaging operation, wherein the first and second reflective surfaces are positioned in the media adapter on a second, opposite side of the imaging surface, wherein the light source is to project light through the transparency medium placed on the imaging surface, and the first reflective surface is to receive light passed through the transparency medium, and the first reflective surface is to reflect light toward the second reflective surface, and the second reflective surface is to direct light through the imaging surface to the at least one sensor.

2. The system of claim 1, further comprising a lens assembly positioned between the first reflective surface and the second reflective surface, the lens assembly focusing the light onto the second reflective surface.

3. The system of claim 1, further comprising a lens assembly positioned between the first reflective surface and the second reflective surface, the lens assembly positioned to magnify an image of the transparency medium during the imaging operation.

4. The system of claim 1, further comprising a lens assembly positioned between the first reflective surface and the second reflective surface, the lens assembly positioned to change resolution of an image of the transparency medium during the imaging operation.

5. The system of claim 1, further comprising a lens assembly movable between the first reflective surface and the second reflective surface, the lens assembly moving with the light source and the sensor of the imaging device during the imaging operation.

6. The system of claim 1, further comprising a lens arranged between the second reflective surface and the at least one sensor, the lens focusing the light onto the at least one sensor.

7. The system of claim 1, further comprising an array of lenses arranged between the second reflective surface and the at least one sensor, the array of lenses focusing the light onto the at least one sensor.

8. The system of claim 1, wherein said imaging device is a CIS imaging device.

9. The system of claim 1, wherein said at least one sensor is a CIS sensor.

10. The system of claim 1, wherein a first position of the first reflective surface and a second position of the second reflective surface are adjustable.

11. The system of claim 1, wherein the media adapter has a housing having a first opening and a second opening, the first opening to allow light passed through the transparency medium from the light source to pass to the first reflective surface, and the second opening to allow light to pass from the second reflective surface to the at least one sensor through the imaging surface.

12. A method comprising:
projecting light from a light source along a first axis onto a transparency imaging surface on which a transparency medium is positioned, wherein light that passes through the transparency medium projects a transparency image;
reflecting, using a first reflective surface, the transparency image along a second axis substantially perpendicular to the first axis; and
reflecting, using a second reflective surface, the reflected transparency image through the transparency imaging surface to at least one sensor,
wherein projecting the light from the light source comprises projecting the light from the light source that is placed in an imaging device on a first side of the transparency imaging surface, wherein the at least one sensor is also in the imaging device on the first side of the transparency imaging surface, and wherein the first and second reflective surfaces are on a second, opposite side of the transparency imaging surface.

13. The method of claim 12, further comprising focusing, using a lens assembly, the reflected transparency image along the second axis between the first and second reflective surfaces.

14. The method of claim 12, further comprising inverting, using a lens assembly between the first and second reflective surfaces, the transparency image.

15. The method of claim 12, further comprising changing resolution of the transparency image on the transparency imaging surface during an imaging operation.

16. The method of claim 12, further comprising magnifying the transparency image on the transparency imaging surface during an imaging operation.

17. The method of claim 12, further comprising moving the projected light over the transparency imaging surface during the imaging operation.

18. A system comprising:
at least one sensor;
an imaging surface;
means for illuminating a transparency medium placed on the imaging surface during an imaging operation, the illuminating to produce a transparency image, wherein the means for illuminating includes a light source positioned on a first side of the imaging surface, and wherein the at least one sensor is also positioned on the first side of the imaging surface; and
means for shifting the transparency image to a predetermined focus point of at least one sensor, wherein the means for shifting includes plural reflective surfaces to reflect light passed from the light source through the transparency medium, wherein the plural reflective surfaces are positioned on a second, opposite side of the imaging surface.

19. The system of claim 18, further comprising means for focusing the transparency image.

20. The system of claim 18, further comprising means for magnifying the transparency image.

21. The system of claim 18, further comprising means for changing resolution of the transparency image.

* * * * *